Patented Sept. 28, 1954

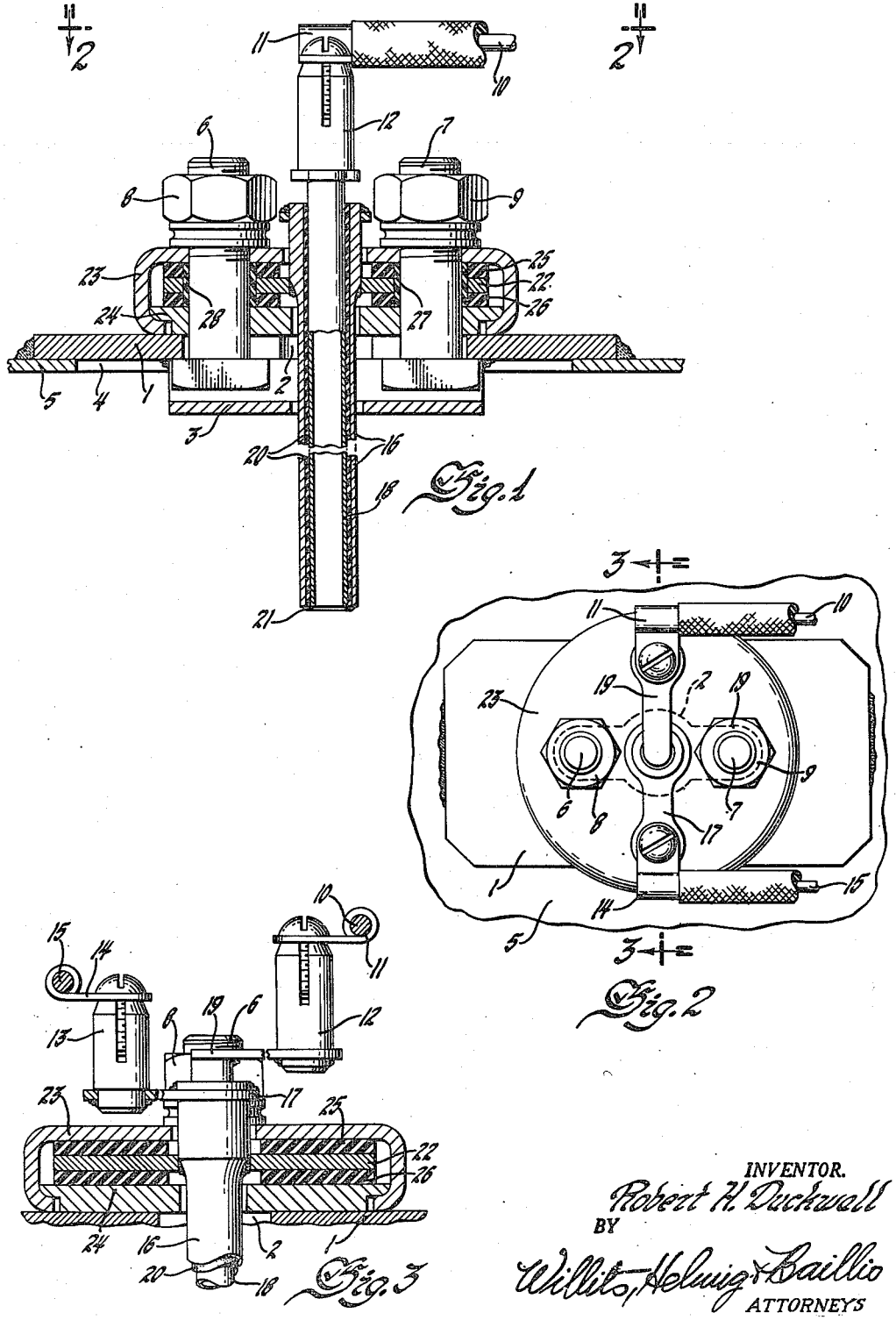

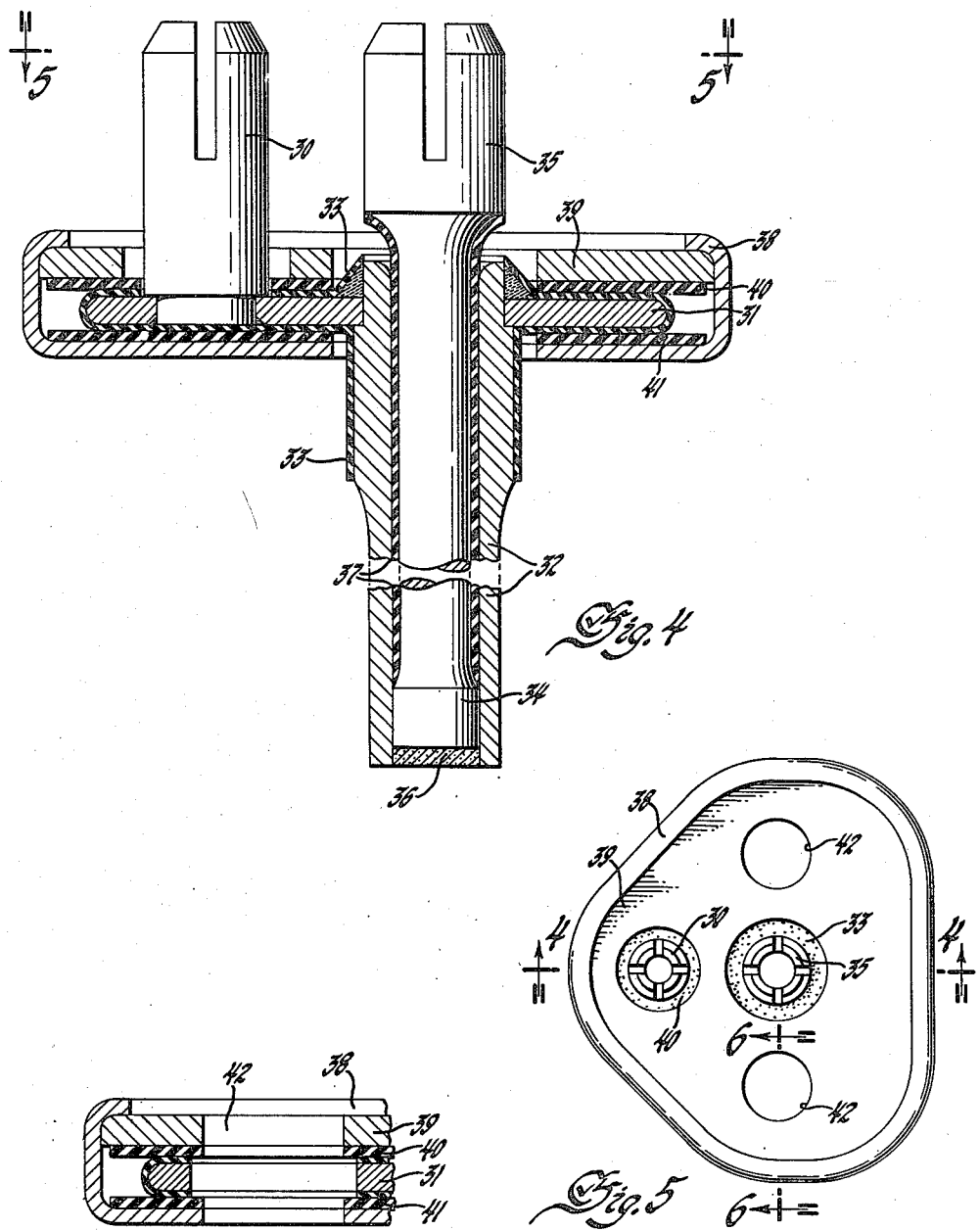

2,690,462

UNITED STATES PATENT OFFICE 2,690,462

THERMOCOUPLE

Robert H. Duckwall, Indianapolis, Ind., assignor to General Motors Corporation, Detroit, Mich., a corporation of Delaware Application February 5, 1952, Serial No. 269,984

6 Claims. (Cl. 136—4)

1

This invention relates to thermocouples and more particularly to a thermocouple adapted for installation on the exhaust duct or other parts of an aircraft jet engine.

An aircraft jet engine is provided with an exhaust duct which carries away gaseous combustion products of extremely high temperature and it is necessary to measure the temperature of these combustion products at various points. Thermocouples which extend into the exhaust duct have been generally used for these temperature measurements, even though much difficulty has been experienced in attempting to provide a satisfactory thermocouple that will meet the peculiar requirements of installation inherent with a jet engine. Some of the more important requirements and the reasons underlying them are:

That portion of the thermocouple which lies exteriorly of the exhaust duct must be of low height inasmuch as present day jet engine installations provide a clearance of only slightly more than 1 inch above the outer skin of the exhaust duct for the thermocouple and its harness.

The thermocouple harness must connect to the thermocouple at a point slightly above the outer skin of the exhaust duct so that the harness will be insulated from the heat of the exhaust duct by an intermediate layer of cooling air. In addition, it is desirable that the thermocouple harness be readily disconnectible from the thermocouple so that economical repairs may be accomplished in the event of harness or thermocouple failure.

The thermocouple and its mounting means should be as small as possible so as to reduce its weight, for a number of thermocouples are utilized and a reduction in the weight of every element is a vital factor of aircraft design. In addition, it is desirable that the thermocouple and its mounting be practically gas leakage proof so as to prevent excessive heating of the harness.

The thermocouple must be of rugged temperature and shock resistant construction for the exhaust gases attain temperatures well over 1200 degrees Fahrenheit, and there may be considerable buffeting.

Some of the objects of this invention, therefore, are to provide a thermocouple that is resistant to high temperatures, that is of minimum size and weight, that is gas leakage proof, and that may be easily disconnected from its harness.

Other objects of this invention are to provide a thermocouple that is economical to manufacture and that is of simple and rugged construction.

Further objects and advantages of the present invention will be apparent from the following description, reference being had to the accompanying drawings, wherein a preferred form of the invention is clearly shown. In the drawings: Fig. 1 is a sectional view of a preferred form of thermocouple as installed on a sectional portion of an exhaust duct; Fig. 2 is a plan view of the thermocouple installation as seen from the exterior of the exhaust duct taken along the line 2—2 of Fig. 1; Fig. 3 is a partial sectional view of the thermocouple taken substantially along the line 3—3 of Fig. 2; Fig. 4 is a sectional view of a modified form of thermocouple taken along the line 4—4 of Fig. 5; Fig. 5 is a plan view taken along the line 5—5 of Fig. 4; and, Fig. 6 is a partial sectional view taken along the line 6—6 of Fig. 5.

Referring now to the drawings and more particularly to Figs. 1 to 3, 1 indicates a flat plate, preferably of stainless steel which is provided with a centrally enlarged elongated slot 2. A U-shaped channel 3 having its legs straddling the slot 2 is welded to the underside of the plate 1. The plate 1 is welded over an opening 4 in the exhaust duct wall 5 as indicated.

Mounting of the thermocouple assembly onto the plate 1 of the wall 5 is accomplished by successively inserting the headed ends of the bolts 6 and 7 through the enlarged portion of the slot 2 and sliding them to the outer extremities of the slot; the channel 3 serving to prevent rotation of the bolts by engaging the bolt heads between its walls and also serving to prevent the possibility of the bolts falling into the exhaust duct. The thermocouple assembly is then mounted on the bolts 6 and 7 and is tightened against the plate 1 by the nuts 8 and 9.

An Alumel wire 10 having an Alumel terminal 11 is screwed to an Alumel terminal post 11 as indicated and similarly the Chromel wire 15 and terminal 14 are fastened to the Chromel terminal post 13. This connector assembly is the subject of application Serial Number 193,981, filed November 3, 1950. The wires 10 and 15 are connected to a suitable device such as a milli-voltmeter (not shown) so that the temperature of the exhaust gas in the exhaust duct may be determined by reference to the E. M. F. which will be generated by the "hot end" of the thermocouple.

The tube 16 and the terminal post 13 are welded to the arm 17 and comprise the Chromel portion of the thermocouple while the hollow rod or tube 18 and the terminal post 12 are welded to the arm 19 and comprise the Alumel portion of the thermocouple. The inner tube 18 has an outer ceramic coating 20 so that it will be electrically insulated from the tube 16 except at the welded "hot end" 21.

A thin circular plate 22 is welded to the tube 16 and supports the assembled tubes in a stainless steel casing consisting of a cup 23 which has its rim spun over the edge of a base plate 24. The plate 22 is electrically insulated from the casing by sheets 25 and 26 which may be of asbestos or a similar suitable insulating material. Bushings 27 and 28 insulate the plate 22 from the bolts 6 and 7 and serve to locate the plate 22 in the casing.

A modified form of the thermocouple assembly is shown in Figs. 4 through 6. It should be understood that the mounting of this form on the exhaust duct will follow that previously illustrated and described.

The Chromel portion of the thermocouple assembly comprises a terminal post 30 which is welded to a plate 31 having welded thereto a tube 32. The tube 32 and the plate 31 are provided with a ceramic insulating layer 33. The Alumel portion of the thermocouple assembly comprises a rod 34 which includes an integral terminal post 35 and which is welded at 36 to the tube 32 but elsewhere insulated therefrom by a ceramic layer 37.

A casing which includes a cup 38 and a plate 39 serves to mount the thermocouple assembly. Chipping of the ceramic coating 33 is prevented by insulating mica sheets 40 and 41. Holes 42 are provided for the mounting bolts.

It should now be apparent that I have devised a thermocouple assembly that is readily mountable on an exhaust wall, that is rugged, that is able to withstand high temperatures, and that is economical in construction. It should also be apparent that I have devised a thermocouple assembly which has both fastening means and harness disconnecting means in a minimum of space, and that is of minimum size and weight.

While the embodiments of the invention as herein disclosed constitute preferred forms, it is to be understood that other forms might be adopted, as may come within the scope of the invention.

I claim:

1. A thermocouple comprising a rigid integral first metallic member including an upwardly extending wire terminal post and a thin flat transverse arm having a downwardly projecting tube; a rigid integral second member metallically dissimilar to the first member including an upwardly extending wire terminal post and a downwardly projecting rod coaxially received within said tube; and means for securing said members to a supporting wall, said members being everywhere insulated from each other excepting for a junction of said tube and rod at their common end.

2. A thermocouple comprising a first metallic member including an upwardly extending wire terminal post and a thin flat plate having welded thereto a downwardly projecting tube; a second member metallically dissimilar to the first member including an upwardly extending wire terminal post and a downwardly projecting rod coaxially received within said tube; a thin flat metallic casing for mounting said thermocouple having a wall on each side of said plate; said members being everywhere insulated from said wall and casing and from each other excepting for a junction of said tube and rod at their common end.

3. A thermocouple comprising a rigid integral first metallic member including a thin flat plate having a downwardly projecting tube and an upwardly projecting wire terminal post laterally spaced from said tube; a rigid integral second member metallically dissimilar to the first member consisting of a straight rod coaxially received in said tube and having its upper end formed into a wire terminal post; a thin flat metallic casing for mounting said thermocouple including a wall on each side of said plate; said members being everywhere insulated from said wall and casing and from each other excepting for a junction of said tube and rod at their common end.

4. A thermocouple comprising a rigid integral first metallic member including a thin flat plate having welded thereto a downwardly projecting tube; a rigid integral second member metallically dissimilar to the first member consisting of a straight rod coaxially received in said tube; a thin flat metallic casing for mounting said thermocouple including a wall on each side of said plate; said members being everywhere insulated from said wall and casing and from each other excepting for a welded junction of said tube and rod at their common end; and wire terminals on said member and said rod.

5. A thermocouple comprising a first metallic member including a vertical tube and a wire terminal post mounted on the outer end of a thin flat arm extending radially from the upper end of said tube; a second member metallically dissimilar to the first member including a rod coaxially received in said tube and a wire terminal post mounted on the outer end of a thin flat arm extending radially from the upper end of said rod; a thin flat plate secured to said tube between its ends; said arms and plate being in proximate parallel planes; and means for mounting said plate on a supporting wall, said members being everywhere insulated from said wall and from each other excepting for a junction of said tube and rod at their lower ends.

6. A thermocouple comprising a rigid integral first metallic member including a vertical tube and a wire terminal post mounted on the outer end of a thin flat arm extending radially from the upper end of said tube; a rigid integral second member metallically dissimilar to the first member including a hollow rod coaxially received in said tube and a wire terminal post mounted on the outer end of a thin flat arm extending radially from the upper end of said rod and in an opposite direction to the arm of said first member; a thin flat metallic plate integrally secured to said tube below its upper end; a thin flat metallic casing for mounting said thermocouple having a wall on each side of said plate; said members being everywhere insulated from said wall and casing and from each other excepting for a junction of said tube and rod at their lower ends.

References Cited in the file of this patent

UNITED STATES PATENTS

| Number | Name | Date |
|---|---|---|
| 2,103,548 | Obermaier | Dec. 28, 1937 |
| 2,385,530 | Paille | Sept. 25, 1945 |
| 2,597,665 | Nicholls | May 20, 1952 |

FOREIGN PATENTS

| Number | Country | Date |
|---|---|---|
| 191,712 | Great Britain | July 5, 1923 |